Oct. 24, 1939.   C. C. ABBOTT   2,177,508
TERMINAL STRUCTURE
Filed July 29, 1936   2 Sheets-Sheet 1
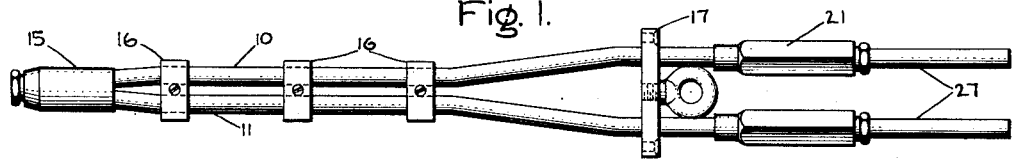
Fig. 1.
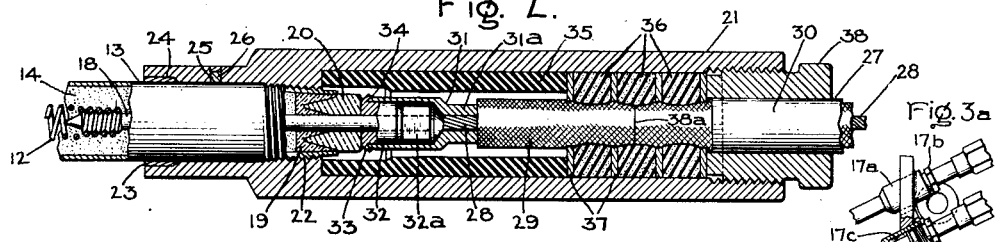
Fig. 2.
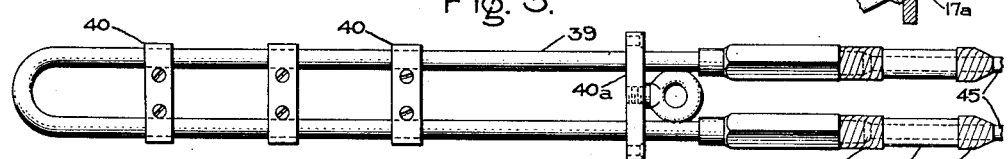
Fig. 3.
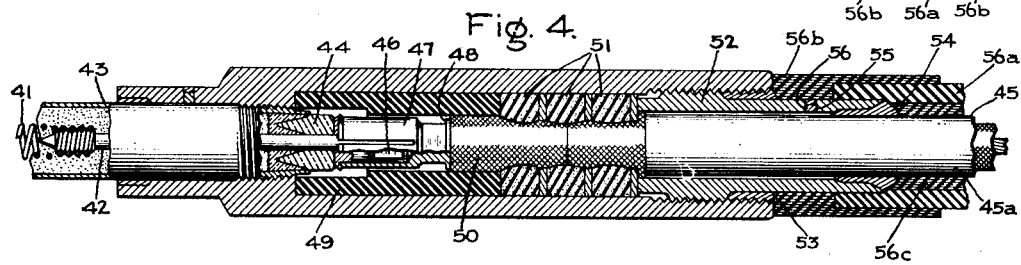
Fig. 4.
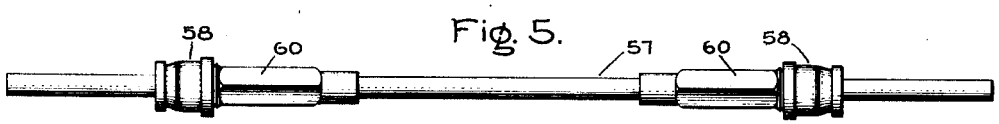
Fig. 5.
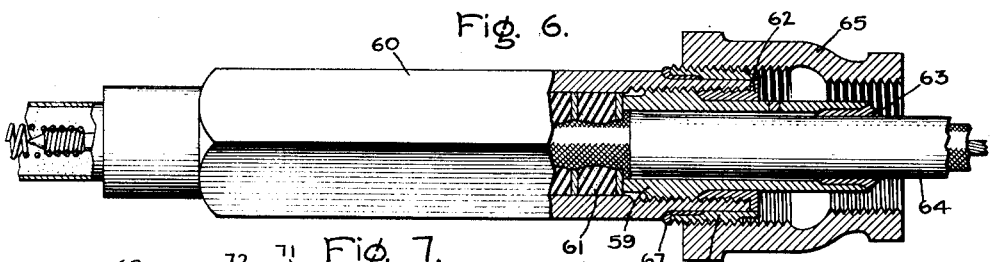
Fig. 6.
Fig. 7.
Inventor:
Charles C. Abbott,
by Harry E. Dunham
His Attorney.

Oct. 24, 1939.　　　C. C. ABBOTT　　　2,177,508
TERMINAL STRUCTURE
Filed July 29, 1936　　　2 Sheets-Sheet 2

Inventor:
Charles C. Abbott,
by Harry E. Dunham
His Attorney.

Patented Oct. 24, 1939

2,177,508

UNITED STATES PATENT OFFICE 2,177,508

TERMINAL STRUCTURE

Charles C. Abbott, Pittsfield, Mass., assignor to General Electric Company, a corporation of New York Application July 29, 1936, Serial No. 93,213

7 Claims. (Cl. 201—64)

This invention relates to terminal structures, more particularly to terminal structures for electric heaters, and it has for its object the provision of an improved terminal structure having means for sealing the terminals of electric heaters, and method of making it.

Although not limited thereto, this invention has particular application to electric heaters of the encased or sheathed type wherein a resistance conductor embedded in an electrically insulating material is inclosed by an outer metallic protective casing.

In one of its aspects, this invention contemplates the provision of improved method and means for sealing the terminals of electric heaters of the sheathed type whereby the heaters are rendered impervious to water, oil, gas and like fluids.

In accordance with this invention, a suitable terminal housing is provided. An electrical supply lead for the heater is directed into this housing and is electrically connected with the terminal of the heater. Within the housing is a flexible yieldable sealing member which is forced into intimate contact with the terminal housing and with the lead so as to effect fluid-tight connections with these members, and thus, a fluid impervious joint between the lead and terminal housing. The terminal housing itself has a fluid-tight connection with the sheath of the heater.

The improved terminal structure further includes improved means for connecting the lead to the terminal comprising a connector member attached to the lead and having a wedge connection with the terminal arranged so that when the yieldable sealing member is applied to the lead, it forces the connector member onto the terminal, the wedge connection forcing the connector and terminal into very good electrical and mechanical contact with each other.

Figure 8:
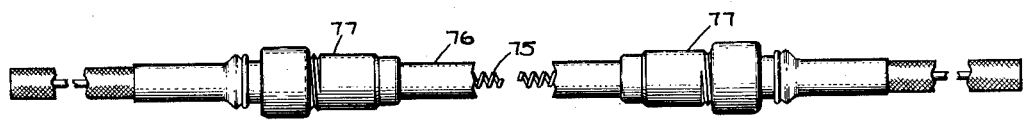
Figure 9:
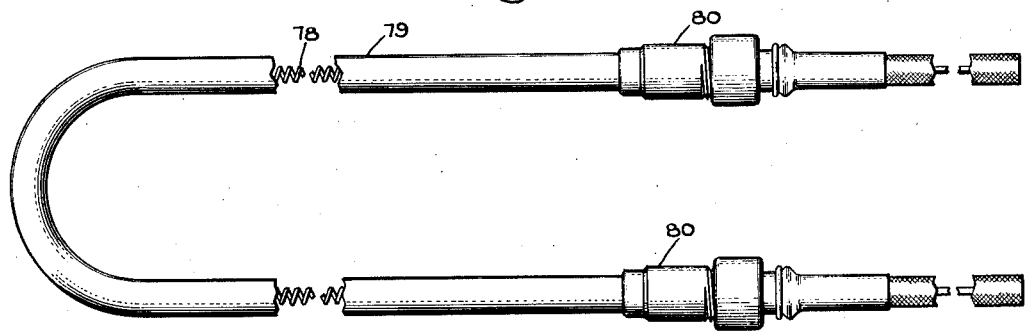
Figure 10:
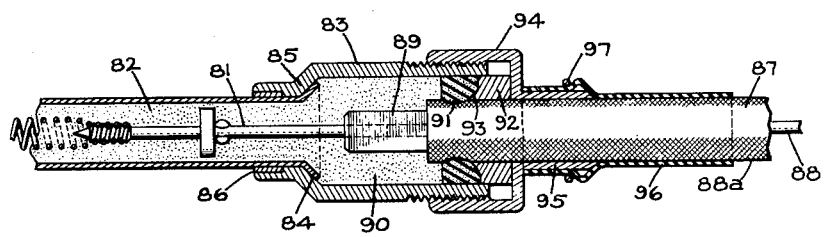
Figure 11:
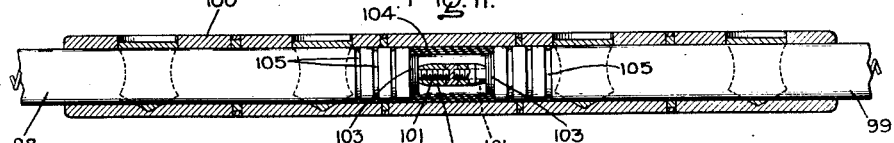
Figure 12:
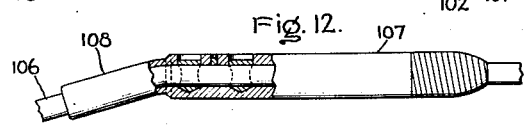

For a more complete understanding of this invention, reference should be had to the accompanying drawings in which Fig. 1 is a plan view of a sheathed electric heater embodying this invention, the heater being particularly adapted to heat a dam gate armature; Fig. 2 is an enlarged fragmentary view mainly in section illustrating a portion of the heater of Fig. 1; Fig. 3 is a plan view partly in section of a sheathed electric heater embodying this invention, this heater also being particularly adapted to heat a dam gate armature; Fig. 3a is a fragmentary view illustrating a cover plate assembly adapted to be used with the heaters of Figs. 1 and 3; Fig. 4 is an enlarged fragmentary view mainly in section illustrating a portion of the heater of Fig. 3; Fig. 5 is a plan view of another sheathed electric heater embodying this invention, this heater being particularly applicable to the heating of drum heads in dam gates; Fig. 6 is an enlarged fragmentary view partly in section illustrating a portion of the heater of Fig. 5; Fig. 7 is a fragmentary view illustrating a particular means for securing a terminal housing to a sheath, arranged in accordance with this invention; Fig. 8 is a fragmentary plan view of a sheathed electric heater arranged in accordance with this invention and particularly adapted for use in connection with street railways and the like to keep the switches and like devices free of snow and ice; Fig. 9 is a fragmentary plan view of another heater particularly adapted as a snow and ice melter similar to the heater of Fig. 8 but showing the terminal ends of the heater adjacent each other; Fig. 10 is an enlarged sectional view of a portion of the heaters of Figs. 8 and 9; Fig. 11 is a fragmentary view similar to Fig. 7, but illustrating the means of Fig. 7 as used to splice two heating units together; and Fig. 12 is a view illustrating a heater similar to that shown in Fig. 7, but of somewhat different form.

Referring more particularly to Figs. 1 and 2, the dam gate armature heater of these figures comprises a pair of sheathed heating elements 10 and 11 arranged in substantially parallel relation, as shown in Fig. 1. The heater preferably will be of the type described and claimed in my U. S. Patent No. 1,367,341, dated February 1, 1921. As shown, each of the heating elements 10, 11 comprises a sinuous resistance conductor 12 (Fig. 2) arranged centrally of a metallic sheath 13 and supported in spaced relation with reference to the sheath by a highly compacted layer of heat refractory, electrically insulating material 14, such as powdered magnesium oxide. The left-hand ends of the heaters 10 and 11, as viewed in Fig. 1, are connected together by means of a suitable plug 15 in which the ends of the sheathed heaters are received and having suitable means (not shown) for electrically interconnecting the resistance conductors 12 of the two heaters. The two heaters 10 and 11 are rigidly secured together in spaced relation and at spaced intervals by suitable spacers 16; and as shown, the heaters at their ends opposite the connector member 15 are spaced apart somewhat farther than the rest of the heaters. To these ends is secured a plate member 17 that constitutes a cover when the heater is applied to the dam gate armature. It will be understood that the heaters are inserted in suitable casings or channels (not shown) and that the cover plate is used to close the casing. In certain cases, particularly where the unit is curved and arranged at an angle with its supporting plate, as shown in Fig. 3a, it is desirable to adjust the unit with reference to its casing. In these cases, the cover plates are provided with stuffing boxes 17a (Fig. 3a) mounted in apertures provided for them in the plate and secured to the plate by brazing. The heating unit is installed in proper relation to its casing, and then the gland nuts 17b are turned in to compress the packing 17c to make a moisture-proof joint.

The right-hand ends of the heaters, as viewed in Figs. 1 and 2, constitute the terminal ends, and arranged within and projecting from each of these ends of the sheaths is a suitable terminal member 18 connected to the resistance conductor 12, as shown in Fig. 2. A suitable fluid impervious seal is provided between the terminal and the sheath comprising a layer of glass 19 adhering to the terminal and to the sheath, and an electric insulator 20 inserted in the glass, as clearly shown in Fig. 2. The specific seal between the terminal and the sheath is arranged substantially in accordance with the seal described and claimed in the United States patent to R. J. Sutton No. 1,922,787, dated February 26, 1935.

The terminal structure arranged in accordance with this invention comprises a suitable metallic tubular terminal housing 21 attached to the terminal end of the sheath and projecting therefrom in alignment with the sheath, as clearly shown in Figs. 1 and 2. As shown in Fig. 2, the terminal housing 21 has a threaded connection 22 with the end of the sheath and is additionally secured to the sheath by means of a suitable brazed or soldered connection 23. This brazed connection is made by forming an annular recess 24 in the end of the housing 21 around the sheath and by filling this recess with a brazed material so as to substantially integrally unite the housing with the sheath. Preferably, the brazed joint will be formed while the space between the housing 21 and the sheath is vented through a suitable aperture 25 provided in the housing for this purpose. This permits the air within this space to vent itself when the sheath and housing are heated due to the brazing operation. After the brazing operation has been completed, a suitable plug 26 is inserted in the aperture 25 and then the exposed end of the plug is brazed to the walls of the housing. The joint between the housing and the sheath is described and claimed in my copending divisional application S. N. 139,448, filed April 28, 1937.

An electrical supply lead 27 enters the housing 21; this lead comprises an electrical supply conductor 28 which is covered by a yielding electrically insulating covering or layer 29 formed of any suitable material, such as rubber. The main portion of the covering 29 in turn is covered by a suitable protective casing 30 formed of any suitable metallic material, such as lead. The main portion of the insulating material 29 within the housing, however, is stripped of the lead covering 30, as clearly shown in Fig. 2. Likewise, the inner end of the conductor 28 is bared of the insulating covering 29, and this bared end is secured to the terminal 18 by means of a suitable connector member 31. The connector member 31, as shown, is provided with a passageway that receives the bared conductor 28 and this portion of the connector is swaged or compressed upon the lead to effect a very good electrical and mechanical connection between the lead and the connector. The remaining portion of the connector has a substantially cylindrical formation and is larger than is the portion connected to the lead. This cylindrical portion is split into two sections, each having a substantially semi-circular cross-section, and is received on a cylindrical terminal member 32 which is rigidly secured to the terminal 18 by means of a swaged or compressed portion 32a on the member forced into good electrical and mechanical engagement with the terminal. The inner end of the terminal member carries an outwardly projecting inclined flange 33 which co-operates with mating inclined surfaces 34 provided on the ends of the semi-cylindrical portions of the connector member. It will be observed in view of this arrangement that when the connector member 31 is slid inwardly in telescopic relation with the cylindrical portion 32 of the terminal member, the inclined surfaces 34 will engage the inclined flange 33 to force the split semicircular sections of the connector into intimate contact with the cylindrical portion 32.

Arranged within the chamber 21 around the terminal and connector members and the inner end portion of the lead 29 is a suitable electrically insulating sleeve 35 having an external diameter substantially equal to the internal diameter of the chamber 21 and having an internal diameter somewhat larger than the insulator 20, the connector member 31 and the lead, as clearly shown. The member 35 may be made of any suitable insulating material, such as fibre.

Arranged on the outer end of the sleeve 35 are a plurality of yieldable sealing members 36 formed of any suitable yielding insulating material, such as rubber. These members are separated from each other and from the sleeve 35 by suitable metallic square washers 37.

Threaded into the outer end of the sleeve 21 is a suitable loading plug 38 which is separated from the outer sealing member 36 by means of an outer washer 37. The plug 38, as shown, is provided with a centrally arranged aperture receiving the lead sheath 30 of the lead.

It will be observed, in view of the foregoing, that when the plug 38 is turned inwardly, it forces the annular rubber sealing members 36 and washers 37 inwardly of the sleeve 21 against the sleeve 35, which acts as a loading member. This compresses the yieldable members 36 and forces them into intimate mechanical contact with the surrounding walls of the sleeve 21 and forces each of them into the yieldable insulating layer 29 of the lead, as clearly shown in Fig. 1. This provides fluid impervious joints between the washers 36 and the chamber 21 and between these washers and the lead, and hence, provides a fluid impervious joint between the lead and the casing 21. Also, when the members 36 are forced into the covering 29 and are forced in toward the terminals of the casing 21, they grip the lead to force the connector 31 inwardly, whereby the semicircular portions of the connector 31 are wedged in tightly against the terminal portion 32, as previously described. While a plurality of members 36 have been shown, in many cases, but one is necessary.

The foregoing construction provides a watertight, oil-tight, and gas-tight seal between the lead 27 and the electric heater.

Where stranded conductors 28 are used, as shown in Fig. 2, there is apt to be breathing of air in and out of the terminal housing through the spaces between the conductor strands due to alternate heating and cooling, with the result that moisture might be carried into the housing. To prevent this, the covering 29 of the lead will be severed on a line which will be opposite one of the members 36, as indicated by numeral 38a, before the lead is assembled wtih the heater. The severed portion will be stripped off and the bared strands thoroughly soldered and swaged to make a substantially solid conductor strand. The severed portion of the covering 29 is then replaced. This structure prevents breathing.

In the dam gate armature heater shown in Figs. 3 and 4, the heater is formed into a single length with the terminal ends adjacent each other. As shown, the heater 39 has a substantially hair-pin shape with the ends of the heater adjacent each other at the right-hand end, as viewed in Fig. 3. The two legs of the hair-pin shaped heater are secured together and spaced apart by spacer members 40, and are provided with a cover plate 40a. This heater also is provided with a sinuous heating conductor 41 connected to terminals 42 arranged in the ends of the heaters. These terminals are sealed to the ends of their sheath 43 by seals 44 similar to the seals of the first form. Electrical supply leads 45 similar to the leads 27 of the first form are provided, and these leads are connected to the terminals by mechanical and electrical connections 46 of the same type as described in the first form, with this exception that in the form shown in Fig. 4, the connector member 47 is provided at its outer end with a flange 48 which extends substantially to the insulating sleeve 49 surrounding it. The flange 48 constitutes a barrier against which the inner end of the flexible insulating covering 50 of the lead 45 bears. This flange 48 prevents the covering 50 from being forced down inwardly around the connector member when the sealing washers 51 are compressed.

In this case, the sealing washers 51 are compressed by a suitable plug 52 threaded inwardly of the terminal housing as shown. The plug 52 is brazed or soldered to the terminal housing to form a liquid-tight joint 53, and as distinguished from the form shown in Fig. 1, is also soldered to the metallic sheath 45a of the lead 45 to form a fluid-tight joint 54 between these members. When the joint 54 is formed, it is preferable to vent the space between the lead sheath 45a and the plug 52. This is accomplished by means of a vent hole 55 which is subsequently closed by a pin 56 in the manner previously described in connection with the pin 26 of Fig. 2, and as described and claimed in my above-mentioned copending application S. N. 139,448.

The lead 45 where it leaves the plug 52 is reenforced by a rubber sleeve 56a fitted on the lead and plug, as shown in Fig. 4. The rubber sleeve at its ends is secured by tape 56b, as shown (Figs. 3 and 4). There is considerable variation of the inner diameter of rubber tubing found on the market. In the event the tubing is too large, the lead is wound with an electric tape 56c to build up its diameter to a suitable size. This tape preferably will be given a coat of insulating varnish before the rubber tube is applied.

The dam gate heater for drum heads shown in Figs. 5 and 6 has its terminals arranged on opposite ends of the heater. Thus, the heater 57 of this form is provided with terminal ends 58 opposite each other. As shown in Fig. 6, the terminal structure of this form of the invention is substantially the same as that shown in Fig. 4. A loading plug 59 is provided screwed into the terminal housing 60 to compress the sealing members 61. The plug 59, the fluid-tight joints 62 and 63 between the housing 60 and the lead 64, respectively, are formed in the manner described previously in connection with Fig. 4. In the case of Fig. 6, suitable coupling or pipe connection members 65 are provided on the terminal ends. As shown, these members are threaded on suitable sleeves 66, which in turn have a relatively tight fit with the ends of the terminal housing 60, and which have fluid-tight connections 67 with the terminal housing.

In Fig. 7, there is illustrated a modified form of connection between the terminal housing and the sheath of the heater. As shown in this case, the terminal housing 68 is relatively long and has a close fit with the outer wall of the sheath 69. The housing 68 is provided with a pair of spaced annular passageways 70 about the sheath, each passageway opening to the exterior of the sheath through a duct or passageway 71. The annular passageways 70 are filled with brazing material 72 through the openings 71 to braze the terminal housing to the sheath. A hole 73 is provided between the passageways 70 to vent the space between the terminal housing and the sheath during the brazing operation, this hole being subsequently closed by a pin 74 which is brazed over, as previously described in connection with the pins 26 and 56. This connection between the terminal housing and sheath is described and claimed in my above-mentioned copending divisional application S. N. 139,448.

In Figs. 8 and 9, there is illustrated a pair of heaters particularly useful as snow melters in street railways. In Fig. 8, the heater is a double-ended heater, whereas in Fig. 9, the terminals are brought together at the same end. Referring to Fig. 8, the heater comprises a resistance conductor 75 enclosed in a metallic sheath 76, the heater having terminal ends 77 opposite each other. In Fig. 9, the resistance conductor 78 is enclosed in a metallic sheath 79 which has a U-shape so that the terminal ends 80 are brought opposite each other.

In each case, the terminal structure is the same, this structure being shown in Fig. 10. As there shown, the resistance conductor is connected to a suitable terminal 81, the resistance conductor and terminal being supported in spaced relation to the sheath by a densely packed layer of heat-refractory, electrically-insulating material 82, such as magnesium oxide. Secured to the outer terminal end of the sheath is an enlarged metallic receptacle or housing 83. As shown, the outer end of the sheath is flared outwardly, as indicated by the numeral 84, and the receptacle is provided with a reduced section 85 fitting this flared portion and the sheath back of it. A fluid-tight joint 86 is formed between the receptacle and the sheath by brazing or soldering.

In this case, the electrical supply lead 87 enters the receptacle 83, as shown, and its electrical conductor 88 is connected to the terminal by means of a suitable connector member 89 which is swaged or compressed on the terminal and the conductor in good mechanical and electrical relation with these members.

The receptacle 83 is filled with a suitable electrically insulating material 90 preferably of the same character as that used in the sheath. Bearing on the outer end of the insulating mass 90 is a suitable yieldable sealing washer 91 similar to the washers of the previous forms described. On the outer side of this washer, there is a relatively heavy metallic washer 92. In this case, the washer 92 is forced inwardly by means of a suitable loading cap 94 which is threaded on the receptacle 83. The washer 92, as shown, is provided with a tapered knife-edge flange 93 on its inner diameter. This flange engages the yieldable member 91 to position it correctly in the casing and to prevent the rubber flowing past the washer when the latter is turned in to compress the rubber. The cap 94 is provided with a centrally arranged aperture which receives the lead, as clearly shown in Fig. 10. It will be understood that when the cap 94 is threaded inwardly on the receptacle 83 it compresses the sealing member 91 between the insulating mass 90 and the metallic washer 92 so as to force it into intimate contact with the walls of the receptacle and into the yielding insulating coating 88a provided for the lead. In other words, in this case the insulating mass 90 serves as a loading abutment, rather than insulating sleeves as in the forms of the invention previously described.

In this case, the lead is not provided with a metallic protective casing, but is reinforced at the point where it leaves the terminal housing by a circular annular metallic member 95 which surrounds the lead and which is formed integrally with the cap 94. Fitted over this member 95 and the lead entering it, is a rubber hose-like reinforcing sleeve 96. The sleeve 96 is secured in its assembled relation with the lead by means of a suitable wire 97 wrapped about the sleeve.

In Fig. 11, there is illustrated two sheathed heating elements 98 and 99 spliced together by a combined connector member and terminal housing 100. The member 100 is brazed to each unit in the manner previously described in connection with Fig. 7, and as described and claimed in my above-mentioned copending divisional application S. N. 139,448. The terminals 101 of the heating elements are secured together by a connector 102 threaded on the terminals, as shown. Washers 103 formed of any suitable insulating material, such as mica, are placed on the terminals between the ends of the heating units and the connector 102. A sleeve 104 formed of a similar material is placed around the connector, as shown. The sheath of each unit is provided with a series of circular grooves 105 to prevent fluxes used in the brazing operations from working along the sheaths to the mica washers 103.

In Fig. 12, there is illustrated a heater 106 having a terminal housing 107 secured to it in the same manner as the terminal housings of Figs. 7 and 11, and described and claimed in my above-mentioned divisional application S. N. 139,448. In certain cases, as in street railway applications, it is necessary to arrange the terminal housing at an angle to the heater proper to facilitate installation of the heater. As shown in Fig. 12, the terminal housing 107 is arranged at a predetermined angle to the heater 106. The housing 107 is provided with a reduced extension 108, and the angular relation between the housing 107 and heater is obtained by bending the housing at a point in the reduced extension beyond the brazed section, as shown. This arrangement causes the terminal housing to grip the heater firmly and obviates the possibility of strains being set up in the brazed joint.

While it has been stated that the various heaters shown in Figs. 1 and 2, 3 and 4, 5 and 6, 8 and 9 are applicable to dam gates and snow melters, it is to be understood that these heaters can be used generally for other applications where electric heaters are desired, and are particularly useful in those connections where the heaters are subjected to deleterious gases, liquids, oil, and the like. The seals are impervious to the entrance of these fluids.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In an electric heater having a sheath, a resistance conductor in said sheath, a terminal structure comprising a sleeve having a fluid-impervious joint with said sheath, a terminal connected to said resistance conductor projecting into said sleeve, a supply lead having a connector member, a telescopic connector between said connector member and said terminal, a flexible washer within said sleeve surrounding said lead and means forcing said washer inwardly of said sleeve to highly compress it between said lead and sleeve to form liquid-tight connections with said members and to force said lead inwardly of said sleeve and thereby force said connector member into good mechanical and electrical relation with said terminal.

2. In an electric heater having a metallic sheath, a resistance conductor in said sheath, a terminal for said resistance conductor projecting from said sheath, a metallic sleeve surrounding said terminal, a fluid impervious joint between the inner end of said sleeve and said sheath, a loading sleeve within said metallic sleeve surrounding said terminal formed of an electrically insulating material, a lead entering said metallic sleeve and having a connector secured to said terminal, said connector having an outwardly projecting flange extending substantially to said loading sleeve and said lead having a yieldable insulating covering extending into said loading sleeve and bearing against said flange, a yieldable member around said covering abutting against said loading sleeve and a loading plug in the outer end of said metallic sleeve forcing said yieldable member against said loading sleeve and compressing it into said yieldable insulating covering.

3. In an electric heater having a resistance conductor and a metallic sheath encasing said conductor, a terminal structure comprising a terminal connected to said conductor, a metallic sleeve about said terminal connected to the end of said sheath, a supply lead entering said sleeve connected with said terminal having an electrical supply conductor and a protective layer about it formed of a yieldable insulating covering and a metallic sheath around said covering, the metallic sheath stripped from the end portion of said covering within said sleeve, a loading sleeve within said metallic sleeve around said terminal, a plurality of yieldable washers within said sleeve surrounding said end portion of said yieldable insulating covering, rigid washers between said yieldable washers, a loading plug threaded into the outer end of said sleeve bearing on said washers and turned in sufficiently to compress said yieldable washers between said loading sleeve and plug to force them into interlocking relation with said yieldable covering of said lead and into tight-fitting relation with said sleeve, and a soldered connection between said sheath covering said lead and said metallic sleeve.

4. In an electric heater having a metallic sheath, a resistance conductor in said sheath, and a terminal connected to said resistance conductor projecting from said sheath, a terminal structure comprising a receptacle secured to the end of said sheath, a lead having an electrical conductor and a yieldable insulating covering entering said receptacle, a connector between said lead and said terminal, powdered electrical insulating material in said receptacle embedding said terminal and connector, a yieldable annular member in said receptacle around said lead bearing on said insulating material, a cap through which said lead passes on said receptacle forcing said yieldable member tightly against said receptacle and into said yieldable insulating covering on said lead, a reinforcing metallic sleeve for said lead fitted about the portion of said lead passing out of said cap, and a reinforcing rubber tube fitted about said metallic sleeve and said lead where it passes out of said metallic sleeve.

5. In an electric heater having a resistance conductor and a metallic sheath encasing said conductor, a terminal structure comprising a terminal connected to said conductor, a supply lead connected with said terminal having a stranded electric conductor covered by an electrically insulating yieldable covering, said covering being severed at a predetermined point and the strands of said conductor being united into a homogeneous whole from said point to the end of said conductor, a casing having a liquid-tight connection with said heater surrounding said lead and a yieldable member highly compressed between said casing and lead at said predetermined point so as to cover the severed portion of said covering.

6. In an electric heater having a resistance conductor and a terminal therefor, a sleeve surrounding said terminal, a loading member within said sleeve constituting an abutment, a lead entering said sleeve having a connector secured to said terminal, said connector having an outwardly projecting flange and said lead having a yieldable insulating covering extending into said loading member and bearing against said flange, a yieldable member around said covering abutting against said loading member and a loading plug in the outer end of said sleeve forcing said yieldable member against said loading member and compressing it into said yieldable insulating covering.

7. In an electric heater having a resistance conductor and a terminal therefor, a terminal structure comprising a casing surrounding said terminal, an abutment in said casing, a lead for said heater entering said casing, a flexible annular member in said casing around said lead bearing against said abutment, and a loading plug forced forwardly of said casing to compress said flexible member to force it tightly into engagement with said lead, the loading plug having a tapered knife edge flange around said lead and extending into said flexible member to position it with reference to the lead and to prevent the material of the flexible member flowing between the lead and plug when the latter is forced in to compress the flexible member.

CHARLES C. ABBOTT.